United States Patent
Hasegawa

(10) Patent No.: US 11,509,345 B2
(45) Date of Patent: Nov. 22, 2022

(54) WIRELESS COMMUNICATION MODULE

(71) Applicant: Fujikura Ltd., Tokyo (JP)

(72) Inventor: Yuta Hasegawa, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 17/267,544

(22) PCT Filed: Dec. 14, 2020

(86) PCT No.: PCT/JP2020/046529
§ 371 (c)(1),
(2) Date: Feb. 10, 2021

(87) PCT Pub. No.: WO2022/014067
PCT Pub. Date: Jan. 20, 2022

(65) Prior Publication Data
US 2022/0190868 A1    Jun. 16, 2022

(30) Foreign Application Priority Data
Jul. 14, 2020 (JP) ............... JP2020-120498

(51) Int. Cl.
*H04B 1/38* (2015.01)
*H04B 1/40* (2015.01)

(52) U.S. Cl.
CPC ................ *H04B 1/40* (2013.01)

(58) Field of Classification Search
CPC ..... H04B 1/04; H04B 2001/0408; H04B 1/40
See application file for complete search history.

(56) References Cited

U.S. PATENT DOCUMENTS 3,990,065 A * 11/1976 Purinton ............ G08B 13/2488
340/572.1
5,864,265 A * 1/1999 Ballance ............... H01P 1/2056
333/206

(Continued)

FOREIGN PATENT DOCUMENTS

| JP | 2005-079885 A | 3/2005 |
| JP | 2011-198887 A | 10/2011 |
| KR | 10-2005-0016942 A | 2/2005 |

OTHER PUBLICATIONS

Chee, Albert et al.; "Integrated Antenna Module for Broadband Wireless Applications" Electronics Packaging Technology Conference, 2004, pp. 240-243. Cited in spec (4 pages).

(Continued)

*Primary Examiner* — Tuan Pham
(74) *Attorney, Agent, or Firm* — WHDA, LLP

(57) ABSTRACT

A wireless communication module includes a wireless module board including an antenna, a frequency converter mounted on the wireless module board and configured to change a frequency of a wireless signal, an amplifier phase shifter mounted on the wireless module board and configured to change a phase and an intensity of the wireless signal, a band-pass filter mounted on the wireless module board so as to be provided between the frequency converter and the amplifier phase shifter, and a band-rejection filter formed on the wireless module board and composed of at least a portion of a plurality of wiring layers electrically connecting the frequency converter, the amplifier phase shifter, and the band-pass filter to each other.

4 Claims, 2 Drawing Sheets

(56) References Cited

U.S. PATENT DOCUMENTS

| | | |
|---|---|---|
| 10,056,922 B1 | 8/2018 | Tsvelykh et al. |
| 2009/0036068 A1 | 2/2009 | Hughes et al. |
| 2011/0170268 A1* | 7/2011 | Takemura ............. H01L 23/552 |
| | | 174/250 |
| 2020/0326416 A1* | 10/2020 | Albasha ................... G01S 7/35 |

OTHER PUBLICATIONS

International Search Report dated Mar. 9, 2021, issued in conuterpart Application No. PCT/JP2020/046529. (2 pages).
Sudo Kaoru et al: "28 GHz Antenna-Array-Integrated Module with Built-In Filters in LTCC Substrate", 2019 IEEE ASIA-PACIFIC MICROWAVE CONFERENCE (APMC), IEEE, Dec. 10, 2019 (Dec. 10, 2019), pp. 1041-1043, XP033741654, DOI:10.1109/APMC46564.2019.9038218 cited in search report for counterpart EP application dated Sep. 13, 2022.

* cited by examiner

WIRELESS COMMUNICATION MODULE

CROSS-REFERENCE TO RELATED APPLICATIONS

The present patent application is a National Stage of PCT Application No. PCT/JP2020/046529, filed Dec. 14, 2020, claiming priority to Japanese Application No. 2020-120498, filed Jul. 14, 2020, each of which is incorporated herein by reference in its entirety.

TECHNICAL FIELD

The present invention relates to a wireless communication module.

BACKGROUND ART

Non-Patent Document 1 discloses a wireless communication module having a wireless module board in which an antenna is formed on one surface and an IC chip mounted on the other surface.

PRIOR ART

Non-Patent Document

[Non-Patent Document 1] Albert Chee, et al, "Integrated Antenna Module for Broadband Wireless Applications," Electronics Packaging Technology Conference, 2004

DISCLOSURE OF INVENTION

Problems to be Solved by the Invention

IC chips mounted on this type of wireless module board include frequency converters that change the frequency of wireless signals and an amplifier phase shifters that change the phase and intensity of wireless signals. In such IC chips, since a waveform of the wireless signal is distorted and unnecessary harmonics (high frequency components away from the frequency band of the wireless signal) are likely to be generated, it is necessary to provide a filter for removing unnecessary harmonics in the wireless communication module.

To remove unnecessary harmonics, a band-pass filter that removes (attenuates) the signal of the frequency adjacent to the frequency band of the wireless signal is used. However, a band-rejection filter is also necessary because a band-pass filter cannot sufficiently remove harmonics (for example, double harmonics, triple harmonics, and the like) in a band that is far outside the frequency band of the wireless signal. That is, it is necessary to provide multiple types of filters in the wireless communication module.

However, if all the filters are composed of mounting components that are mounted on the wireless module board, the number of components that constitute the wireless communication module will increase. On the other hand, if all the filters are formed by the wiring layer of the wireless module board, sufficient characteristics of filters cannot be obtained. For example, when the band-pass filter is formed by a wiring layer, the loss of the wireless signal in the band-pass filter increases, and the characteristics of the band-pass filter cannot be sufficiently obtained.

The present invention has been made in view of the above circumstances, and provides a wireless communication module capable of sufficiently obtaining characteristics of a plurality of types of filters while maintaining the number of components small.

Means for Solving the Problems

A first aspect of the present invention is a wireless communication module including a wireless module board including an antenna, a frequency converter mounted on the wireless module board and configured to change a frequency of a wireless signal, an amplifier phase shifter mounted on the wireless module board and configured to change a phase and an intensity of the wireless signal, a band-pass filter mounted on the wireless module board so as to be provided between the frequency converter and the amplifier phase shifter, and a band-rejection filter formed on the wireless module board and composed of at least a portion of a plurality of wiring layers electrically connecting the frequency converter, the amplifier phase shifter, and the band-pass filter to each other.

In the wireless communication module described above, since the band-pass filter is not formed by the wiring layer of the wireless module board, the characteristics of the band-pass filter are not affected by the dielectric loss tangent and the distance between the layers in the wireless module board, and the loss of the wireless signal in the band-pass filter can be reduced to a small value. That is, the characteristics of the band-pass filter can be sufficiently obtained.

On the other hand, even if the band-rejection filter is composed of the wiring layer of the wireless module board, the characteristics of the band-rejection filter are hardly affected by the dielectric loss tangent and the distance between the layers in the wireless module board. That is, the characteristics of the band-rejection filter can be sufficiently obtained. Since the band-rejection filter is composed of the wiring layer of the wireless module board, compared with the case where the band-rejection filter is a component (chip component, and the like) mounted on the wireless module board, the number of components constituting the wireless communication module can be reduced to be small.

According to the wireless communication module according to a second aspect of the present invention, in the first aspect, the band-rejection filter is preferably formed inside the wireless module board.

According to the wireless communication module according to a third aspect of the present invention, in the first or second aspect, the band-rejection filter is preferably formed so that the width of the wiring layer changes as advancing in a longitudinal direction of the wiring layer.

According to the wireless communication module according to the fourth aspect of the present invention, in any one of the first to third aspect, the band-rejection filter preferably attenuates or eliminates unnecessary harmonics having frequencies at least one of two times and three times that of a wireless signal.

Effects of the Invention

According to the above aspect of the present invention, the characteristics of the band-pass filter and the band-rejection filter can be sufficiently obtained while reducing the number of components of the wireless communication module to be small.

BEST MODE FOR CARRYING OUT THE INVENTION

Hereinafter, an embodiment of the present invention will be described with reference to FIGS. 1 to 3.

Figure 1:
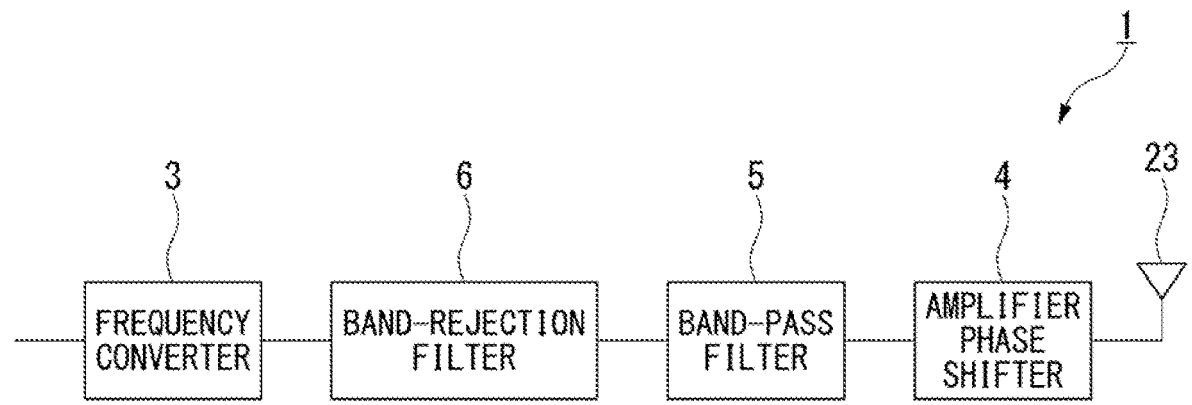
FIG. 1 is a block diagram of a wireless communication module according to an embodiment of the present invention.
Figure 2:
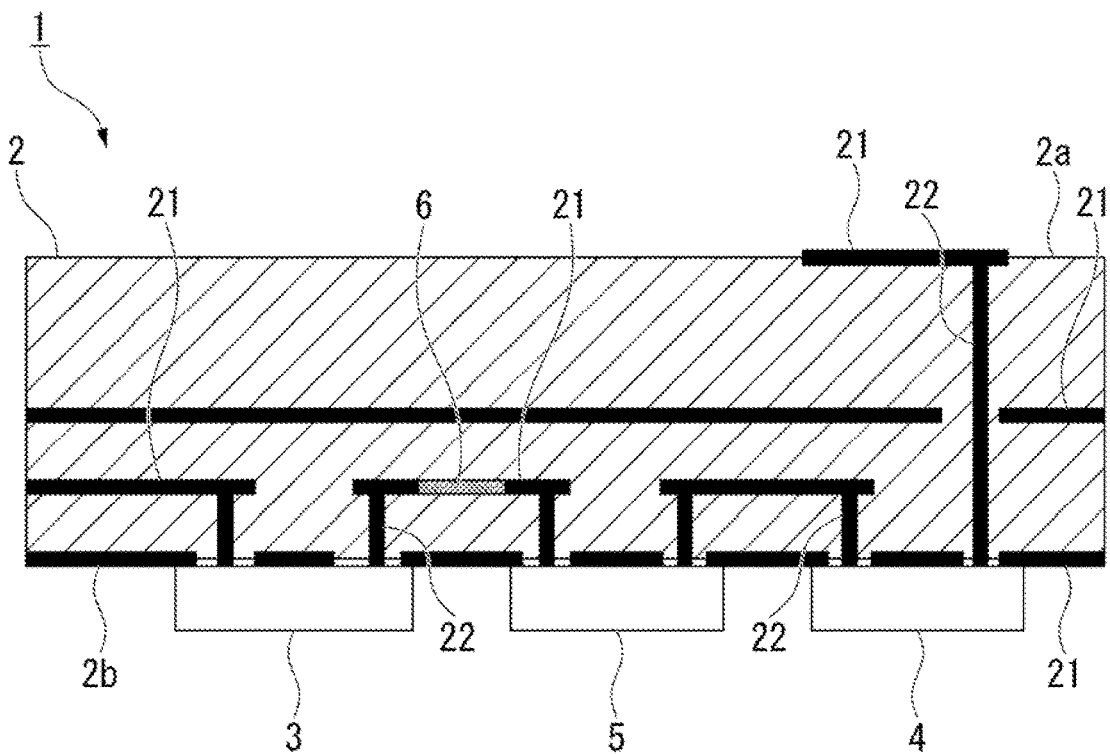
FIG. 2 is a cross-sectional view of a wireless communication module according to an embodiment of the present invention.

As shown in FIGS. 1 and 2, the wireless communication module 1 according to the present embodiment includes a wireless module board 2, a frequency converter 3, an amplifier phase shifter 4, a band-pass filter 5, and a band-rejection filter 6.

The wireless module board 2 has a plurality of wiring layers 21 via an interlayer insulating film. The wiring layer 21 is made of a conductor such as copper (Cu), and the frequency converter 3, the amplifier phase shifter 4, and the band-pass filter 5, which will be described later, are electrically connected to each other. The plurality of wiring layers 21 are arranged at intervals in a board-thickness direction (vertical direction in FIG. 2) of the wireless module board 2. The wiring layers 21 may be formed on at least both surfaces 2a and 2b of the wireless module board 2 (in FIG. 2, lower and upper surfaces). In the present embodiment, the wiring layer 21 is also formed inside the wireless module board 2. In FIG. 2, the number of wiring layers 21 aligned in the board-thickness direction of the wireless module board 2 is four (four-layer wiring); however, the number is not limited to this. In addition, a through-hole 22 extending in the board-thickness direction of the wireless module board 2 are formed appropriately inside the wireless module board 2. The through-hole 22 electrically connects the wiring layers 21 aligned in the board-thickness direction of the wireless module board 2.

The wireless module board 2 has an antenna 23. The antenna 23 of the present embodiment is formed so as to radiate a wireless signal from one surface (upper surface in FIG. 2) 2a of the wireless module board 2. The antenna 23 may not be formed at least on the other surface (lower surface in FIG. 2) 2b of the wireless module board 2. Although not shown in FIG. 2, the antenna 23 may be formed on one surface 2a of the wireless module board 2 or may be formed on an inner layer of the wireless module 2. Furthermore, the antenna 23 may be formed on one surface 2a of the wireless module board 2 and then covered with a dielectric layer.

The frequency converter 3 is an IC chip that changes the frequency of the wireless signal and is mounted on the wireless module board 2. The amplifier phase shifter 4 is an IC chip that changes the phase and intensity of a wireless signal and is mounted on the wireless module board 2. In the present embodiment, the frequency converter 3 and the amplifier phase shifter 4 are mounted on the other surface 2b of the wireless module board 2 and connected to the wiring layer 21 of the wireless module board 2 via a thorough-hole 22 and solder (not shown).

The amplifier phase shifter 4 is connected to the frequency converter 3 via the wiring layer 21, the through-hole 22, and the like. In addition, the amplifier phase shifter 4 is connected to the antenna 23 via the wiring layer 21 and the through-hole 22. That is, the amplifier phase shifter 4 is provided between the frequency converter 3 and the antenna 23.

The band-pass filter 5 is a chip component that passes a frequency band of a wireless signal and attenuates a signal (noise) in a frequency band (hereinafter, referred to as an adjacent band) which is adjacent to the aforementioned frequency band. For example, when the frequency band of the wireless signal required by the wireless communication module 1 is approximately 26 to 30 GHz, the adjacent band attenuated or removed by the band-pass filter 5 is, for example, 26 GHz or less and in the range of approximately 30 to 60 GHz. In the band-pass filter 5, it is difficult to sufficiently attenuate unnecessary harmonics (signals in a high frequency band which is far outside the frequency band and the adjacent band of the wireless signal, particularly harmonics having at least one of two times and three times frequencies) which are generated in the frequency converter 3 and the amplifier phase shifter 4.

The band-pass filter 5 is mounted on the wireless module board 2. In the present embodiment, the band-pass filter 5 is mounted on the other surface (lower surface in FIG. 2) 2b of the wireless module board 2 similar to the frequency converter 3 and the amplifier phase shifter 4, and is connected to the wiring layer 21 of the wireless module board 2 via the through-hole 22.

The band-pass filter 5 is connected to the frequency converter 3 via the wiring layer 21 and the through-hole 22. In addition, the band-pass filter 5 is connected to the amplifier phase shifter 4 via the wiring layer 21 and the through-hole 22. That is, the band-pass filter 5 is provided between the frequency converter 3 and the amplifier phase shifter 4.

The band-rejection filter 6 attenuates harmonics in a frequency band which is far outside the frequency band and the adjacent band of the above-described wireless signals. The band of harmonics attenuated or removed by the band-rejection filter 6 is, for example, approximately two times to three times the frequency band. When the frequency band of the wireless signal required in the wireless communication module 1 is approximately 26 to 30 GHz, the harmonic bands are, for example, approximately 52 to 60 GHz and 68 to 90 GHz.

The band-rejection filter 6 is composed of a portion of a plurality of wiring layers 21. The band-rejection filter 6 may be composed of, for example, a wiring layer 21 exposed to the outside of the wireless module board 2. However, in the present embodiment, the band-rejection filter 6 is composed of a wiring layer 21 formed inside the wireless module board 2 and not exposed to the outside.

Figure 3:
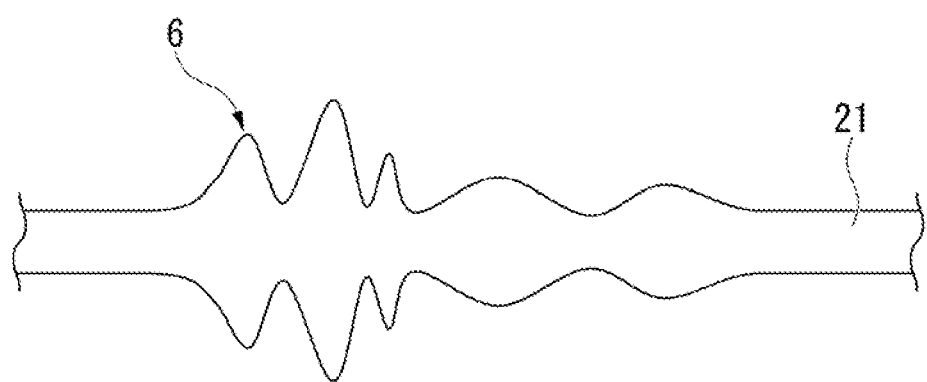
FIG. 3 is a plan view showing a band-rejection filter in the wireless communication module of FIG. 2.

As shown in FIG. 3, the band-rejection filter 6 is formed so that the width of the wiring layer 21 changes as advancing in a longitudinal direction of the wiring layer 21. In particular, the band-rejection filter 6 is formed so that the width of the wiring layer 21 constituting the band-rejection filter 6 is continuously increased or decreased (that is, a portion of the surface of the wiring layer 21 has a corrugated shape). In FIG. 3, the left-right direction corresponds to the longitudinal direction of the wiring layer 21, and the vertical direction corresponds to the width direction of the wiring layer 21. By changing the width of the wiring layer 21 constituting the band-rejection filter 6 in such manner, characteristic impedance of the wiring layer 21 constituting the band-rejection filter 6 changes. Here, a desired characteristic impedance can be obtained by adjusting the shape of the wiring layer 21 by a simulation such as waveform analysis. As a result, the harmonics can be attenuated in the band-rejection filter 6 composed of the wiring layer 21.

As shown in FIG. 2, the band-rejection filter 6 of the present embodiment is composed of a wiring layer 21 that connects the frequency converter 3 and the band-pass filter 5. That is, the band-rejection filter 6 is provided between the frequency converter 3 and the band-pass filter 5.

Next, an example of the operation of the wireless communication module 1 configured as described above will be described.

In the wireless communication module 1, first, the wireless signal is input to the frequency converter 3, so that the frequency converter 3 changes the frequency of the wireless signal. Next, the wireless signal output from the frequency converter 3 is input to the band-rejection filter 6. The band-rejection filter 6 attenuates or removes harmonics superimposed on the wireless signal (in particular, unnecessary harmonics having frequencies at least one of two times and three times that of the wireless signal).

After that, the wireless signal output from the band-rejection filter 6 is input to the band-pass filter 5. The band-pass filter 5 attenuates or removes a signal in an adjacent band (a band near the frequency band of the wireless signal) superimposed on the wireless signal. The wireless signal output from the band-pass filter 5 is input to the amplifier phase shifter 4. In each amplifier phase shifter 4, the phase and intensity of the wireless signal are changed.

Finally, the wireless signal output from the amplifier phase shifter 4 is radiated from the antenna 23. In particular, the wireless signal output from the amplifier phase shifter 4 is radiated from one surface 2a of the wireless module board 2.

As described above, in the wireless communication module 1 of the present embodiment, the band-pass filter 5 is not formed by the wiring layer 21 of the wireless module board 2. Therefore, the characteristics of the band-pass filter 5 are not affected by the dielectric loss tangent and the distance between the layers in the wireless module board 2, and the loss of the wireless signal in the band-pass filter 5 can be reduced to a small value. That is, the characteristics of the band-pass filter 5 can be sufficiently obtained.

On the other hand, even if the band-rejection filter 6 is composed of the wiring layer 21 of the wireless module board 2, the characteristics of the band-rejection filter 6 are hardly affected by the dielectric loss tangent and the distance between the layers in the wireless module board 2. That is, the characteristics of the band-rejection filter 6 can be sufficiently obtained. Since the band-rejection filter 6 is composed of the wiring layer 21 of the wireless module board 2, compared with the case where the band-rejection filter 6 is a component (chip component) mounted on the wireless module board 2, the number of components constituting the wireless communication module 1 can be reduced to be small.

From the above, according to the wireless communication module 1 of the present embodiment, the characteristics of the band-pass filter 5 and the band-rejection filter 6 can be sufficiently obtained while reducing the number of components of the wireless communication module 1 to be small.

In addition, according to the wireless communication module 1 of the present embodiment, the band-rejection filter 6 is formed inside the wireless module board 2. As a result, the area of the surface of the wireless module board 2 can be reduced as compared with the case where the band-rejection filter 6 is formed on the surface of the wireless module board 2 (for example, formed on the other surface 2b). Therefore, the size of the wireless module board 2 can be reduced.

According to the wireless communication module 1 of the present embodiment, the band-rejection filter 6 composed of the wiring layer 21 is formed so as to continuously change the width of the wiring layer 21 in the longitudinal direction of the wiring layer 21. As a result, it is possible to obtain the desired characteristics of the band-rejection filter 6 without increasing the size occupied by the band-rejection filter 6 in the wireless module board 2, that is, while reducing the increase in size of the wireless module board 2.

Moreover, according to the wireless communication module 1 of the present embodiment, the antenna 23 is formed so as to radiate wireless signals from a surface (one surface 2a) facing the opposite side of the surface (the other surface 2b) on which the frequency converter 3 and the amplifier phase shifter 4 are mounted. As a result, the wireless signal radiated from the antenna 23 can be effectively suppressed from being affected by the noise (In particular, harmonics) superimposed in the frequency converter 3 and amplifier phase shifter 4.

Although the details of the present invention have been described above, the present invention is not limited to the above-described embodiment, and various modifications can be made without departing from the gist of the present invention.

In the wireless communication module of the present invention, the band-rejection filter 6 may be composed of, for example, a wiring layer 21 connecting the band-pass filter 5 and the amplifier phase shifter 4. That is, the band-rejection filter 6 may be provided between the band-pass filter 5 and the amplifier phase shifter 4. In addition, the band-rejection filter 6 may be composed of, for example, a wiring layer 21 connecting the amplifier phase shifter 4 and the antenna 23. That is, the band-rejection filter 6 may be provided between the amplifier phase shifter 4 and the antenna 23.

In the wireless communication module of the present invention, for example, a plurality of amplifier phase shifters 4 may be mounted on the wireless module board 2. In such a case, the wireless signal output from the band-pass filter 5 can be distributed to the plurality of amplifier phase shifters 4 and then output to the antenna 23.

In the wireless communication module of the present invention, for example, a plurality of band-pass filters 5 and a plurality of amplifier phase shifters 4 may be mounted on the wireless module board 2. In such a case, the wireless signal output from the frequency converter 3 can be distributed to the plurality of band-pass filters 5 and then output to the amplifier phase shifter 4.

In the wireless communication module that distributes the wireless signal to the plurality of band-pass filters 5 and the amplifier phase shifter 4 in such manner, higher output and higher gain can be obtained.

In addition, in the wireless communication module that distributes the wireless signal to the plurality of band-pass filters 5 and the amplifier phase shifter 4 as described above, for example, the band-rejection filter 6 is provided between the band-pass filter 5 and the plurality of amplifier phase shifters 4 respectively, or a band-rejection filter 6 is provided between the frequency converter 3 and a plurality of band-pass filters 5.

That is, the wireless communication module described above includes a plurality of band-rejection filters 6. However, in the wireless communication module of the present invention, since the band-rejection filter 6 is composed of the wiring layer 21, it is possible to suppress or prevent the increase in size of the wireless communication module due to the increase in the number of the band-rejection filter 6.

In the wireless communication module of the present invention, the frequency converter 3, the amplifier phase shifter 4, and the band-pass filter 5 may be mounted on, for example, one surface 2*a* of the wireless module board 2 on which the antenna 23 is formed.

DESCRIPTION OF THE REFERENCE SYMBOLS

1: Wireless communication module
2: Wireless module board
3: Frequency converter
4: Amplifier phase shifter
5: Band-pass filter
6: Band-rejection filter
21: Wiring layer
23: Antenna

The invention claimed is:

1. A wireless communication module comprising:
a wireless module board comprising an antenna;
a frequency converter mounted on the wireless module board and configured to change a frequency of a wireless signal;
an amplifier phase shifter mounted on the wireless module board and configured to change a phase and an intensity of the wireless signal;
a band-pass filter mounted on the wireless module board so as to be provided between the frequency converter and the amplifier phase shifter; and
a band-rejection filter formed on the wireless module board and composed of at least a portion of a plurality of wiring layers connecting the frequency converter and the band-pass filter to each other or connecting the amplifier phase shifter and the band-pass filter to each other;
wherein the band-rejection filter is formed by a wiring layer disposed inside the wireless module board and is formed by adjusting a shape of the wiring layer.

2. The wireless communication module according to claim 1, wherein the band-rejection filter is formed inside the wireless module board.

3. The wireless communication module according to claim 1, wherein the band-rejection filter is formed so that the width of the wiring layer changes as advancing in a longitudinal direction of the wiring layer.

4. The wireless communication module according to claim 1, wherein the band-rejection filter attenuates or eliminates unnecessary harmonics having frequencies at least one of two times and three times that of a wireless signal.

* * * * *